(12) United States Patent
Nakamura et al.

(10) Patent No.: US 7,997,741 B2
(45) Date of Patent: Aug. 16, 2011

(54) PROJECTOR

(75) Inventors: Kunihisa Nakamura, Iida (JP); Keisuke Sakagami, Suwa (JP); Toru Kurihara, Matsumoto (JP); Wataru Kitahara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 334 days.

(21) Appl. No.: 12/357,072

(22) Filed: Jan. 21, 2009

(65) Prior Publication Data

US 2009/0185146 A1    Jul. 23, 2009

(30) Foreign Application Priority Data

Jan. 23, 2008  (JP) ................................. 2008-012455

(51) Int. Cl.
*G03B 21/14* (2006.01)
(52) U.S. Cl. ...................................... 353/119; 353/122
(58) Field of Classification Search .................... 353/74, 353/119, 122
See application file for complete search history.

(56) References Cited

U.S. PATENT DOCUMENTS

| 6,840,628 B2 * | 1/2005 | Arai et al. ....................... 353/58 |
| 2007/0242236 A1 | 10/2007 | Sugiura | |

FOREIGN PATENT DOCUMENTS

| CN | 1959520 A | 5/2007 |
|---|---|---|
| CN | 1961256 A | 5/2007 |
| JP | 10-328386 A | 12/1998 |
| JP | 2000-51493 A | 2/2000 |
| JP | 2001-21987 A | 1/2001 |
| JP | 2004-207400 A | 7/2004 |
| JP | 2006-222300 A | 8/2006 |
| JP | 2007-233028 A | 9/2007 |

* cited by examiner

*Primary Examiner* — Kevin Pyo
(74) *Attorney, Agent, or Firm* — AdvantEgde Law Group, LLC

(57) ABSTRACT

A projector includes a light source device, a optical modulator which modulates luminous flux emitted from the light source device according to image information, a projection optical device which enlarges and projects the luminous flux modulated in the optical modulator, and an outer casing which houses the light source device, the optical modulator and the projection optical device thereinside, in which the outer casing has a ceiling surface and a bottom surface intersecting with respect to the vertical direction and a side surface connecting to the ceiling surface and the bottom surface, in which a concave portion which is recessed toward the inside is formed at the bottom surface side in the side surface, and in which a first connection terminal group connected to an external device through connection cables is arranged at a bottom portion of the concave portion in an exposed state.

3 Claims, 6 Drawing Sheets

PROJECTOR

BACKGROUND

1. Technical Field

The present invention relates to a projector.

2. Related Art

In related art, a projector including a light source device, a optical modulator which modulates luminous flux emitted from the light source device and a projection optical device which enlarges and projects luminous flux modulated by the optical modulator on a screen is known (for example, JP-A-2004-207400 (Patent Document 1) is an example of related art).

In the projector described in Patent Document 1, a connection terminal group (connector group) to be connected to an external device through connection cables for inputting image information (image signals) and the like from the external device and for outputting prescribed signals to the external device is arranged at a back surface portion of an outer casing in a state of being exposed outside.

However, in the projector described in Patent Document 1, connectors of respective connection cables and the like protrude from the back surface portion of the outer casing in a state in which plural connection cables are connected to the connection terminal group, therefore, the state is undesirable in appearance.

Also in the projector described in Patent Document 1, a structure in which a package-shaped cover member is used and an opening of the cover member is attached to the back surface portion of the outer casing to thereby cover the connection terminal group, connectors of respective connection cables and the like by the cover member is applied for making the projector desirable state in appearance. The plural connection cables connected to the connection terminal group are wired outside through a cutout portion formed at the opening of the cover member by being bent in the state in which the cover member is attached to the outer casing.

Incidentally, connectors of respective connection cables are in a state of protruding from the back surface portion of the outer casing. The respective connection cables have a certain degree of stiffness, therefore, a position at which the cables can be bent will be a position apart from the connector. Accordingly, it is necessary for the cover member to have the shape which does not mechanically interfere with respective connection cables, that is, to have the depth dimension of the package shape which is larger than a protruding dimension of respective connection cables with respect to the outer casing (the dimension from tips of the connectors to the position at which the cables can be bent). Therefore, the depth dimension of the cover member becomes relatively large, and a length dimension in the front-and-back direction of the projector is larger in the state in which the cover member is attached to the outer casing, which is not desirable in appearance. In addition, it is necessary to secure space larger than the size of the projector when the projector is installed.

SUMMARY

An advantage of some aspects of the invention is to provide a projector which has a desirable appearance and small installation space even in the state in which connection cables are connected to the connection terminal group.

A projector according to an aspect of the invention includes a light source device, a optical modulator which modulates luminous flux emitted from the light source device according to image information, a projection optical device which enlarges and projects the luminous flux modulated in the optical modulator and an outer casing which houses the light source device, the optical modulator and the projection optical device thereinside, in which the outer casing has a ceiling surface and a bottom surface intersecting with respect to the vertical direction and a side surface connecting to the ceiling surface and the bottom surface, in which a concave portion which is recessed toward the inside is formed at the bottom surface side in the side surface, and in which a first connection terminal group connected to an external device through connection cables is arranged at a bottom portion of the concave portion in an exposed state.

According to the aspect of the invention, the first connection terminal group is arranged in the exposed state at the bottom portion of the concave portion formed at the side surface in the outer casing. According to this structure, the connection cables are connected to the first connection terminal group at the inner side from the side surface of the outer casing. That is, the protruding amount of the connectors of respective connection cables and the like from portions other than the concave portion in the side surface becomes small and the connectors of the connection cables and the like are concealed by the concave portion in the state in which the plural connection cables are connected to the first connection terminal group. Accordingly, the desirable structure in appearance can be obtained even in the state in which the connection cables are connected to the first connection terminal group. It is also possible to save installation space of the projector.

In the same manner as related art, when a structure in which a cover member is attached to the outer casing to cover the concave portion (first connection terminal group) and connectors of respective connection cables and the like is applied, the appearance of the projector can be made more desirable.

In this case, a protruding dimension of respective connection cables from portions other than the concave portion in the side surface (dimension from portions other than the concave portion to a position where respective connection cables can be bent) becomes small according to the above structure, therefore, a depth dimension of the package shape in the cover member can be set small. Accordingly, even in the state in which the cover member is attached to the outer casing, the appearance of the projector is not damaged.

Furthermore, the concave portion is formed at the bottom surface side in the side surface. According to this structure, for example, when the projector is placed in a suspended attitude (attitude in which the projector is suspended from a ceiling and the like in a state that the ceiling surface is positioned at the lower side and the bottom surface is positioned at the upper side), the concave portion is positioned at the upper side. That is, the structure in which connectors of respective connection cables and the like are hardly seen from a user positioned below the projector can be realized, which makes the appearance of the projector desirable.

In a projector according to another aspect of the invention, it is preferable that a sidewall portion of the bottom surface side in the concave portion is cut out, thereby connecting the bottom portion of the concave portion and the bottom surface.

According to this aspect of the invention, the bottom portion of the concave portion and the bottom surface are connected, therefore, respective connection cables do not interfere with the sidewall portion of the bottom surface side in the concave portion when the respective connection cables connected to the first connection terminal group are wired to the bottom surface side. Accordingly, wiring of respective connection cables can be easily realized. In addition, when respective connection cables are wired from the bottom portion of the concave portion toward the bottom surface, a structure in which respective connection cables are hardly seen from the ceiling surface side (for example, from the lower side in the suspended attitude), which can make the appearance of the projector more desirable. Further, since there is not the sidewall portion, it is easy to put fingers thereinto and to put on and take off the connection cables.

In a projector according to still another aspect of the invention, it is preferable that a binding member attached to the bottom surface and which binds the plural connection cables connected to the first connection terminal group is provided.

According to this aspect of the invention, the projector includes the binding member, therefore, respective connection cables connected to the first connection terminal group can be bound once on the bottom surface by the binding member. Accordingly, wiring of respective connection cables can be easily performed. In addition, respective connection cables are bound once on the bottom surface by the binding member, thereby realizing a structure in which respective connection cables are hardly seen from the ceiling surface side (for example, from the lower side in the suspended attitude), which makes the appearance of the projector more desirable.

In a projector according to still another aspect of the invention, it is preferable that a second connection terminal group connecting to an external device through connection cables is arranged in an exposed state at a portion other than the concave portion in the side surface.

When the projector is placed in a positive attitude (attitude in which the projector is placed on a desk and the like in a state that the ceiling surface is positioned at the upper side and the bottom surface is positioned at the lower side, which is opposite to the suspended attitude), connection cables are put on and taken off with respect to the connection terminal group frequently as compared with the case in which the projector is placed in the suspended attitude. That is, in the case that the projector is placed in the positive attitude, when the first connection terminal group is used, it is difficult to put on and take off connection cables with respect to the first connection terminal group because the first connection terminal group is arranged at the bottom portion of the concave portion, which makes improvement of user-friendliness harder.

According to this aspect of the invention, a second connection terminal group is arranged separately from the first connection terminal group in the exposed state at a portion other than the concave portion in the side surface. According to this structure, when the projector is placed in the positive attitude, it is easy to put on and take off connection cables with respect to the second connection terminal group by using the second connection terminal group which is not arranged at the concave portion. Accordingly, the first connection terminal group is used when the projector is placed in the suspended attitude and the second connection terminal group is used when the projector is placed in the positive attitude, that is, respective connection terminal groups are used according to the attitude of the projector, thereby improving user-friendliness.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
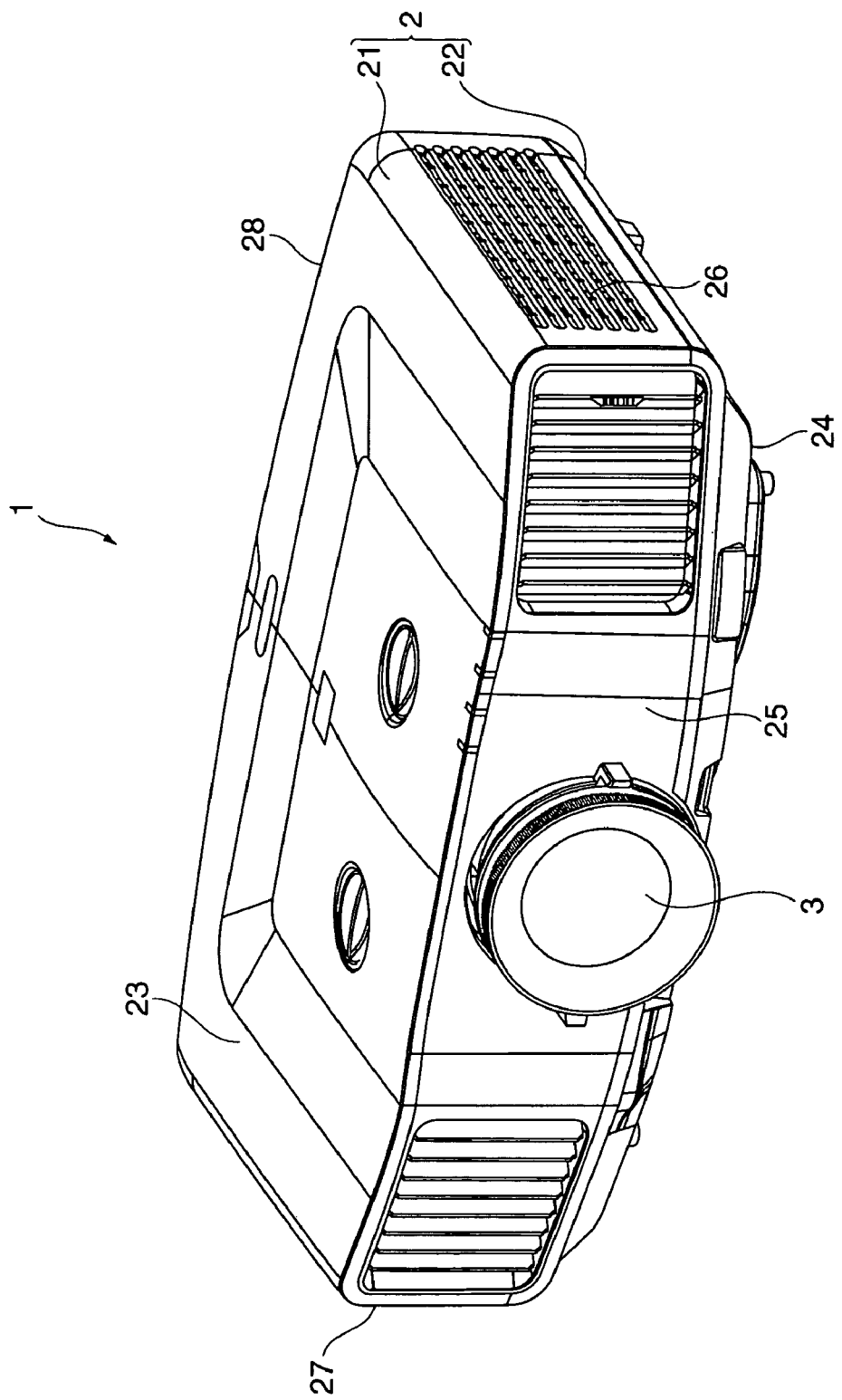
FIG. 1 is a perspective view showing an appearance of a projector according to First Embodiment of the invention.

Hereinafter, First Embodiment of the invention will be explained based on the drawings.
Structure in Appearance FIG. 1 is a perspective view showing an appearance of a projector 1 according to First Embodiment. Specifically, FIG. 1 is a perspective view of the projector 1 in a state of being placed in a positive attitude seen from a front upper side. The projector 1 forms image light by modulating luminous flux emitted from a light source in accordance with image information, enlarging and projecting the formed image light on a screen (not shown). The projector 1 includes an outer casing 2 forming an outer package as shown in FIG. 1.

The outer casing 2 houses an apparatus body of the projector 1. The outer casing 2 includes an upper casing 21 and a lower casing 22 as shown in FIG. 1.

The upper casing 21 has a ceiling surface 23 having an approximately rectangular shape intersecting with respect to the vertical direction, which is formed in a package shape with an opening at one side.

Similarly, the lower casing 22 has a bottom surface 24 having an approximately rectangular shape intersecting with respect to the vertical direction, which is formed in a package shape with an opening at one side.

The upper casing 21 and the lower casing 22 are connected to thereby form a front surface portion 25, a right-side surface 26, a left-side surface 27 and a back surface portion 28 as side surface s to the outer casing 2.

The structure of the back surface portion 28 of the outer casing 2 will be described later.
Internal Structure FIG. 2 is a view schematically showing the apparatus body housed inside the outer casing 2.

Figure 2:
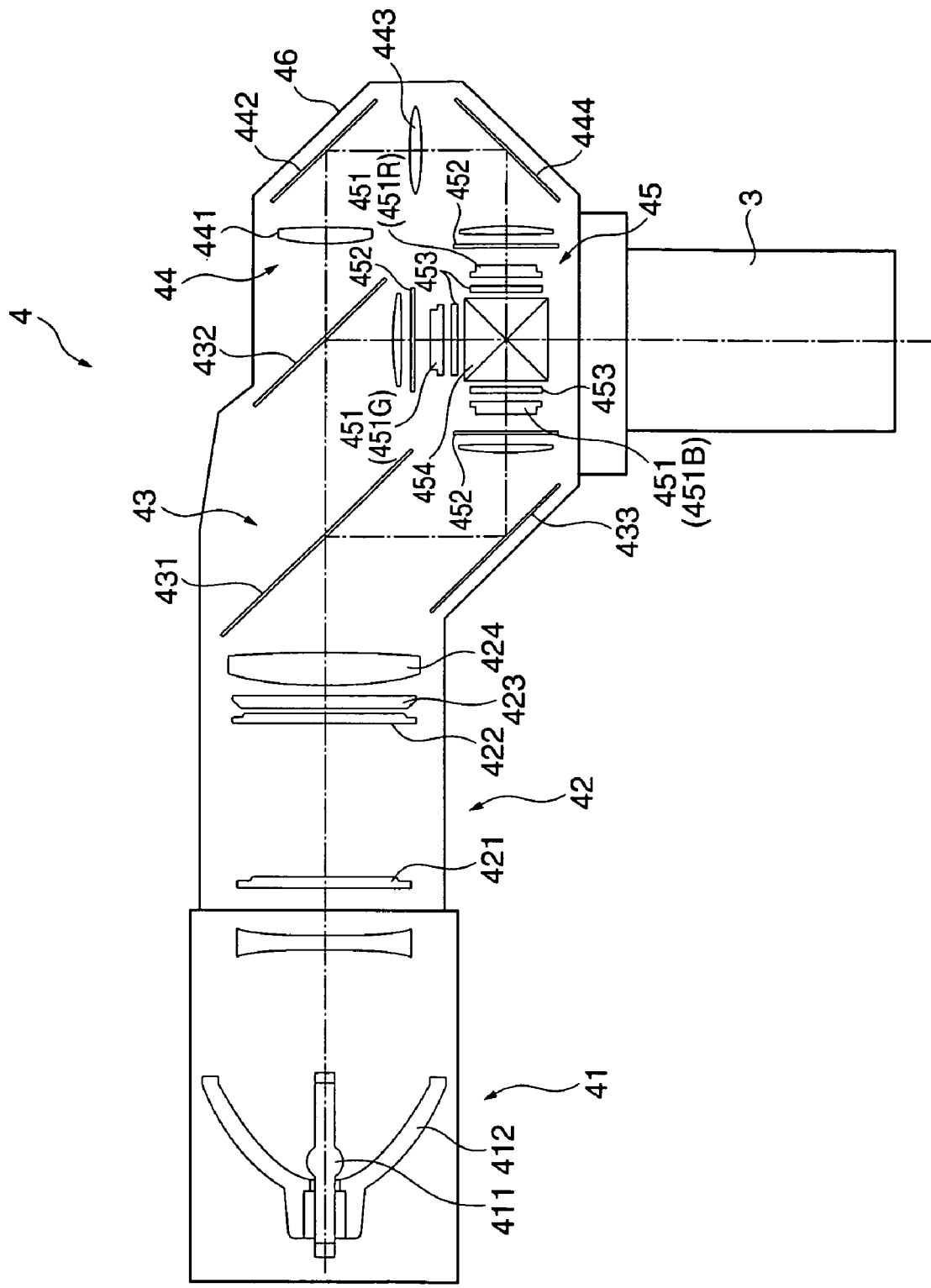
FIG. 2 is a view schematically showing an apparatus body housed inside an outer casing according to First Embodiment of the invention.

Inside the outer casing 2, the apparatus body shown in FIG. 2 is housed. The apparatus body includes a projection lens 3 as a projection optical device, an optical unit 4 and the like.

Though not shown, in the outer casing 2, a cooling unit having a cooling fan for cooling the inside of the projector 1 and the like, a power unit for supplying power to respective components of the projector 1, a controller for controlling operations of respective components of the projector 1 and the like are arranged in space other than the space in which respective members 3, 4 are arranged.

The projection lens 3 is exposed from an approximately center portion of the front surface portion 25 of the outer casing 2 at the tip thereof as shown in FIG. 1, enlarging and projecting image light formed by the optical unit 4 on the screen.

The optical unit 4 forms image light corresponding to image information by optically processing luminous flux emitted from the light source under control of the controller. The optical unit 4 includes a light source device 41, an illumination system 42, a color separation system 43, a relay optical system 44, an optical system 45 and a casing for optical components which houses respective optical components 41 to 45 as shown in FIG. 2.

The light source device 41 includes a light source 411 and a reflector 412. The light source device 41 emits luminous flux to the illumination system 42, aligning the emitting direction of luminous flux emitted from the light source 411 by the reflector 412.

The illumination system 42 includes a first lens array 421, a second lens array 422, a polarization conversion element 423 and a superimposing lens 424. The luminous flux emitted from the light source device 41 is divided into plural partial luminous fluxes by the first lens array 421 and focused near the second lens array 422. Respective partial luminous fluxes emitted from the second lens array 422 are incident so that the center axis (main beam) is vertical to an incident surface of the polarization conversion element 423, which are emitted as straight polarization light of approximately one kind by the polarization conversion element 423. The plural partial luminous fluxes emitted as the straight polarization light from the polarization conversion element 423 and passed through the superimposing lens 424 are superimposed on three liquid crystal panels 451 of the optical system 45, which are described later.

The color separation system 43 includes two dichroic mirrors 431, 432 and a reflection mirror 433 as shown in FIG. 2, having a function of separating plural partial luminous fluxes emitted from the illumination system 42 into three color lights of red, green and blue by these dichroic mirrors 431, 432 and the reflection mirror 433.

The relay optical system 44 includes an incident-side lens 441, a relay lens 443 and reflection mirrors 442, 444, having a function of leading the color lights separated by the color separation system 43, for example, red light to a liquid crystal panel 451R of the red light side of the optical system 45, which is described later.

The optical system 45 forms image light by modulating incident light flux in accordance with image information. The optical system 45 includes liquid crystal panels 451 (a liquid crystal panel 451R at the red color side, a liquid crystal panel 451G at the green light side and a liquid crystal panel 451B at the blue color side) as three optical modulators, light incident-side polarizers 452 arranged at the previous stage of optical paths of respective liquid crystal panels 451, light exiting-side polarizers 453 arranged at the subsequent stage of optical paths of respective liquid crystal panel 451 and a cross dichroic prism 454 as a color combining system.

The three light incident-side polarizers 452 transmit only polarized light having a polarizing direction which is approximately the same as the polarizing direction aligned by the polarization conversion element 423 in respective luminous fluxes separated by the color separation system 43 and absorbs the other luminous fluxes, which are formed by a polarizing film being bonded on a light-transmissive substrate.

The three liquid crystal panels 451 have a structure in which liquid crystal as an electro-optic material is sealed between a pair of transparent glass substrates, in which the alignment state of liquid crystal is controlled in accordance with a drive signal from the controller to modulate the polarizing direction of polarized light emitted from the light incident-side polarizers 452.

The three light exiting-side polarizers 453 include a function which is approximately the same as the incident-side polarizers 452, transmitting polarized light of the fixed direction in luminous fluxes emitted through the liquid crystal panels 451 and absorbing other luminous fluxes.

The cross dichroic prism 454 forms color image by combining respective color lights modulated according to the color light emitted from the light exiting-side polarizers 453. The cross dichroic prism 454 has an approximately squire shape in plan view in which four right-angle prisms are bonded together, and two dielectric multilayer films are formed at boundary faces where the right angle prisms are bonded. The dielectric multilayer films transmits the color light emitted from the liquid crystal panel 451G and passed through the exiting-side polarizer 453, and reflects respective color lights emitted from the liquid crystal panels 451R, 451B and passed through respective exiting-side polarizers 453. Accordingly, image light is formed by combining respective color lights. Then, the image light formed at the cross dichroic prism 454 is emitted to the projection lens 3.

Structure of Back Surface Portion

Figure 3:
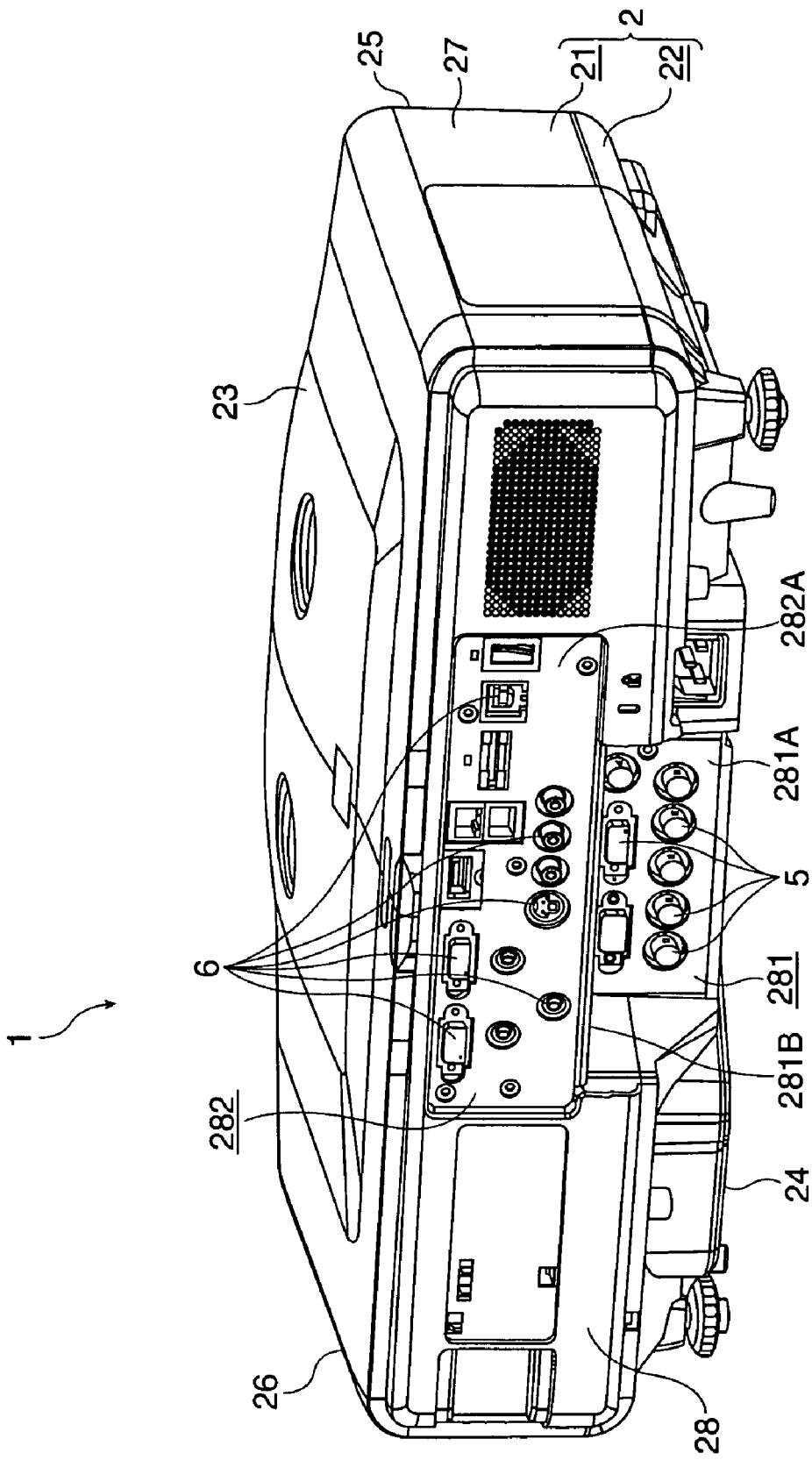
FIG. 3 is a perspective view showing a structure of a back surface portion according to First Embodiment of the invention.
Figure 4:
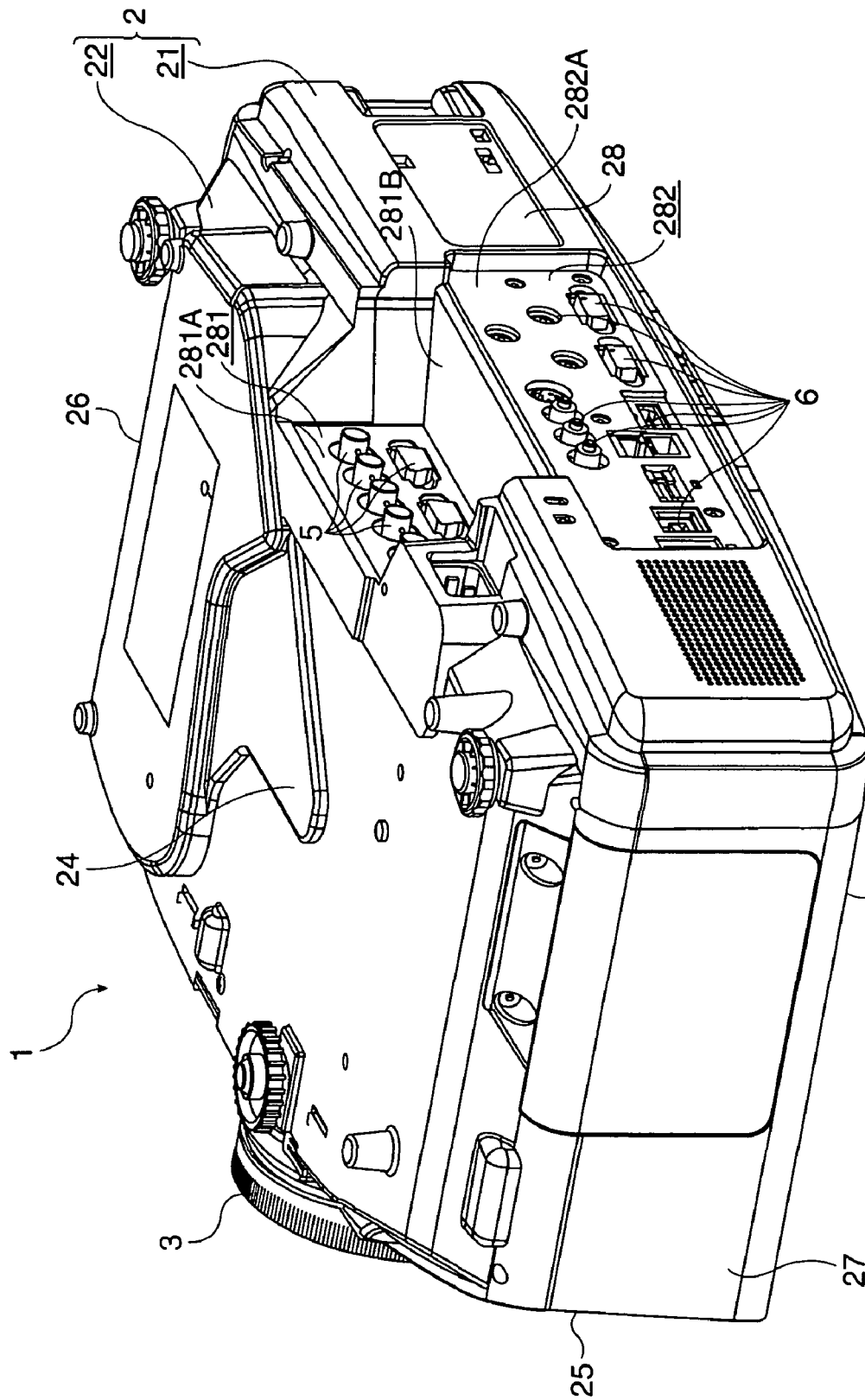
FIG. 4 is a perspective view showing a structure of the back surface portion according to First embodiment of the invention.

FIG. 3 and FIG. 4 are perspective views showing a structure of the back surface portion 28. Specifically, FIG. 3 is a perspective view of the projector 1 in a state of being placed in a positive attitude seen from the back upper side. FIG. 4 is a perspective view of the projector 1 in a state of being placed in a suspended attitude seen from the back upper side.

In the back surface portion 28, a first concave portion 281 recessed toward the inside and having a rectangular shape when seen from the back surface side is formed at the bottom surface 24 side of the almost central part in the right-and-left direction as shown in FIG. 3 and FIG. 4.

At a bottom portion 281A of the first concave portion 281, a first connection terminal group 5 to be connected to an external device (not shown) through connection cables Cb (refer to FIG. 5) for inputting image information (image signals) and the like from the external device through the connection cables Cb or for outputting prescribed signals to the external device is arranged in an exposed state.

Also, as shown in FIG. 4, a sidewall portion of the bottom surface 24 side in the first concave portion 281 is cut to be formed so that the bottom portion 281A of the first concave portion 281 and the bottom surface 24 are connected.

In the back surface portion 28, a second concave portion 282 recessed toward the inside in a depth dimension smaller than the first concave portion 281 and having a rectangular shape when seen from the back surface side is formed at the ceiling surface 23 side of the first concave portion 281.

At a bottom portion 282A of the second concave portion 282, a second connection terminal group 6 to be connected to an external device through connection cables for inputting image signals and the like from the external device through the connection cables or for outputting prescribed signals to the external device is arranged in an exposed state in the same manner as the first connection terminal 5.

As shown in FIG. 3 and FIG. 4, a sidewall portion of the bottom surface 24 side in the second concave portion 282 is cut to be formed so that the bottom portion 282A of the second concave portion 282 and a side wall portion 281B of the first concave portion 281 are connected.

The respective connection terminal groups 5, 6 explained above are electrically connected to the controller. The image signals and the like inputted through the respective connection terminal groups 5, 6 are processed by the controller. Also, prescribed signals are outputted to the external device through the respective connection terminals 5, 6 under control of the controller.

Use Pattern of First Connection Terminal Group

Next, a use pattern of the first connection terminal group 5 will be explained.

Figure 5:
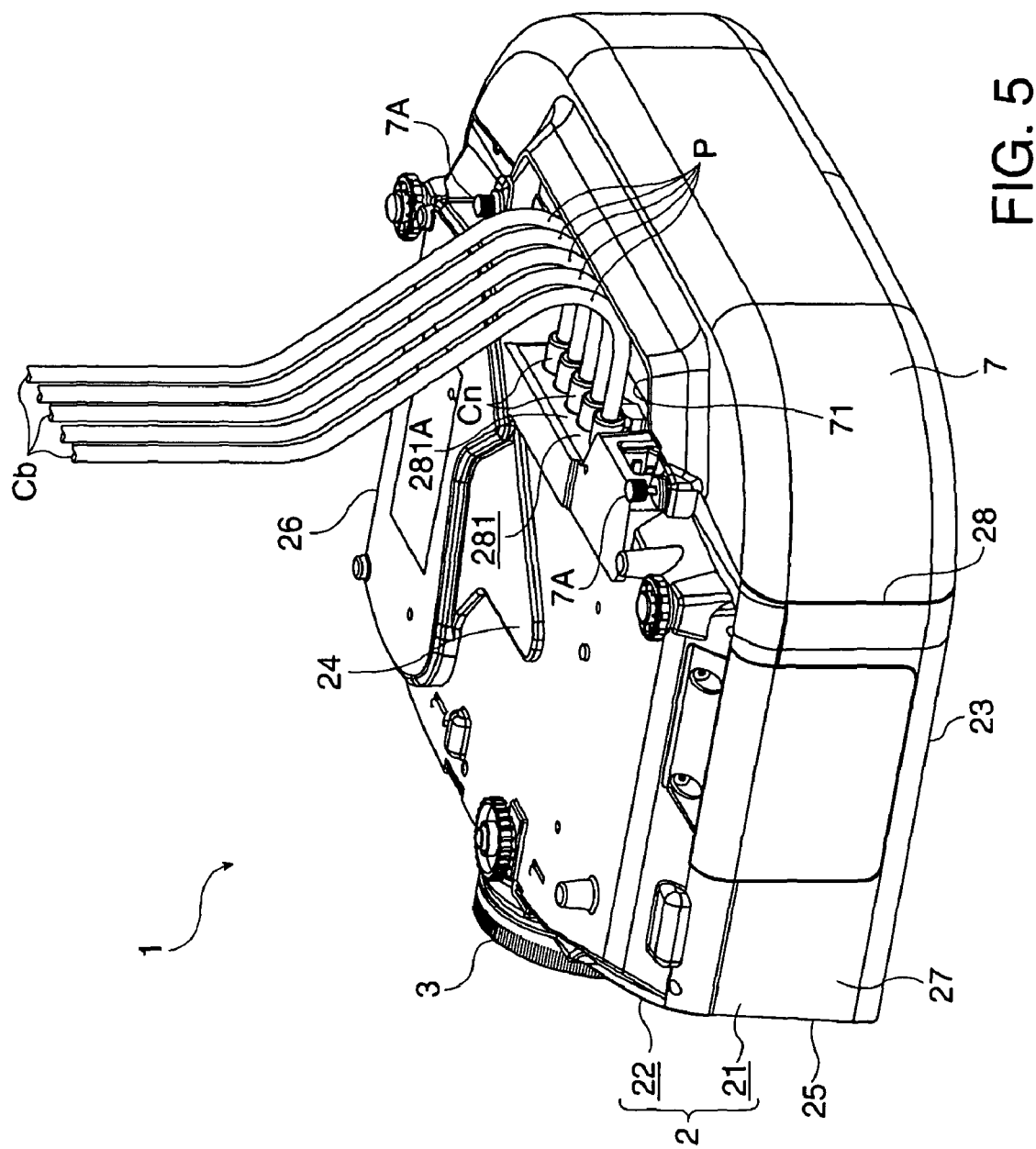
FIG. 5 is a view explaining a use pattern of a first connection terminal group according to First Embodiment of the invention.

FIG. 5 is a view explaining the use pattern of the first connection terminal group 5. Specifically, FIG. 5 is a perspective view showing the use pattern of the first connection terminal group 5 in a state shown in FIG. 4.

The first connection terminal group 5 is chiefly used in a state in which the projector 1 is placed in the suspended attitude as shown in FIG. 5.

When the first connection terminal group 5 is used, a cover member 7 is attached to the outer casing 2 as shown in FIG. 5.

The cover member 7 is formed to be a package shape in which an opening (not shown) which is approximately the same dimension as the outline dimension of the back surface portion 28 is formed at a front surface side and the opening dimension becomes gradually small toward the back surface side. The cover member 7 is attached to the outer casing 2 by an edge portion of the opening being fixed to the bottom surface 24 by fixing screws 7A. In this state, the cover member 7 covers the back surface portion 28 (respective connection terminals 5, 6).

In the state in which the cover member 7 is attached to the outer casing 2, a cutout portion 71 having an approximately U-shape which is cut out so as to surround the first concave portion 281 is formed at a sidewall portion of the bottom surface 24 side.

The plural connection cables Cb (five cables in FIG. 5) connected to the first connection terminal group 5 are bent toward the upper front side through a gap between the cutout portion 71 and the first concave portion 281, and wired upward along a vertical axis passing through the approximately central position of the bottom surface 24 as shown in FIG. 5.

The second connection terminal group 6 is not specifically shown, however, chiefly used in a state in which the projector 1 is placed in the positive attitude as shown in FIG. 3.

The above First Embodiment has the following advantages.

In the embodiment, the first connection terminal group 5 is arranged at the bottom portion 281A of the first concave portion 281 formed at the back surface portion 28 in the exposed state in the outer casing 2. According to the structure, respective connection cables Cb are connected to the first connection terminal group 5 at the inner side from the back surface portion 28 of the outer casing 2. Specifically, the protruding amount of the connectors Cn of respective connection cables Cb (FIG. 5) and the like from portions other than the first concave portion 281 in the back surface portion 28 becomes small and the connectors Cn of the connection cables Cb and the like are concealed by the first concave portion 281 in the state in which the respective connection cables Cb are connected to the first connection terminal group 5. Accordingly, the desirable structure in appearance can be obtained even in the state in which the connection cables Cb are connected to the first connection terminal group 5. It is also possible to save installation space of the projector 1.

The appearance of the projector 1 can be more desirable when the cover member 7 is attached to the outer casing 2 to cover the back surface portion 28 (respective connection terminal groups 5, 6, connectors Cn of respective connection cables cb and the like).

In this case, the protruding dimension of respective connection cables Cb from portions other than the first concave portion 281 in the back surface portion 28 (dimension from portions other than the first concave portion 281 to a position P (FIG. 5) where respective connection cables Cb can be bent) becomes small according to the above structure, therefore, a depth dimension of the package shape in the cover member 7 can be set small. Accordingly, a length dimension in the front-and-back direction of the projector 1 does not become large even in the state in which the cover member 7 is attached to the outer casing 2, which does not damage the appearance of the projector 1.

Furthermore, the first concave portion 281 is formed at the bottom surface 24 side in the back surface portion 28. According to the structure, the first concave portion 281 is positioned at the upper side when the projector 1 is placed in the suspended attitude. This is the structure in which the connectors Cn of respective connection cables Cb and the like are hardly seen from a user positioned below the projector 1, which makes the appearance of the projector 1 desirable.

In addition, since the bottom portion 281A of the first concave portion 281 and the bottom surface 24 are connected, respective connection cables Cb do not mechanically interfere with the sidewall portion at the bottom surface 24 side in the first concave portion 281 when the respective connection cables Cb connected to the first connection terminal group 5 are wired to the bottom surface 24 side. Therefore, the wiring of the respective connection cables Cb can be easily realized. When the respective connection cables Cb are wired from the first concave portion 281 toward the bottom surface 24, that is the structure in which the respective connection cables Cb are hardly seen from a user positioned below the projector 1, which makes the appearance of the projector 1 more desirable. In addition, since there is not the sidewall portion, it is easy to put fingers thereinto and to put on and take off the connection cables Cb.

Furthermore, the second connection terminal group 6 is arranged separately from the first connection terminal group 5 at a portion other than the first concave portion 281 in the back surface portion 28. According to the structure, in the case that the projector 1 is placed in the positive attitude, connection cables can be easily put on and taken off with respect to the second connection terminal group 6 by using the second connection terminal group 6 which is not arranged at the first concave portion 281. Therefore, the first connection terminal group 5 is used when the projector 1 is placed in the suspended attitude and the second connection terminal group 6 is used when the projector 1 is placed in the positive attitude, that is, the respective connection terminal groups 5, 6 are used according to the attitude of the projector 1, thereby improving the user-friendliness.

Second Embodiment

Next, Second Embodiment of the invention will be explained with reference to the drawings.

In the following explanation, the same numerals and signs are put to the same structures and the same components as First Embodiment, and detailed explanation thereof will be omitted or simplified.

Figure 6:
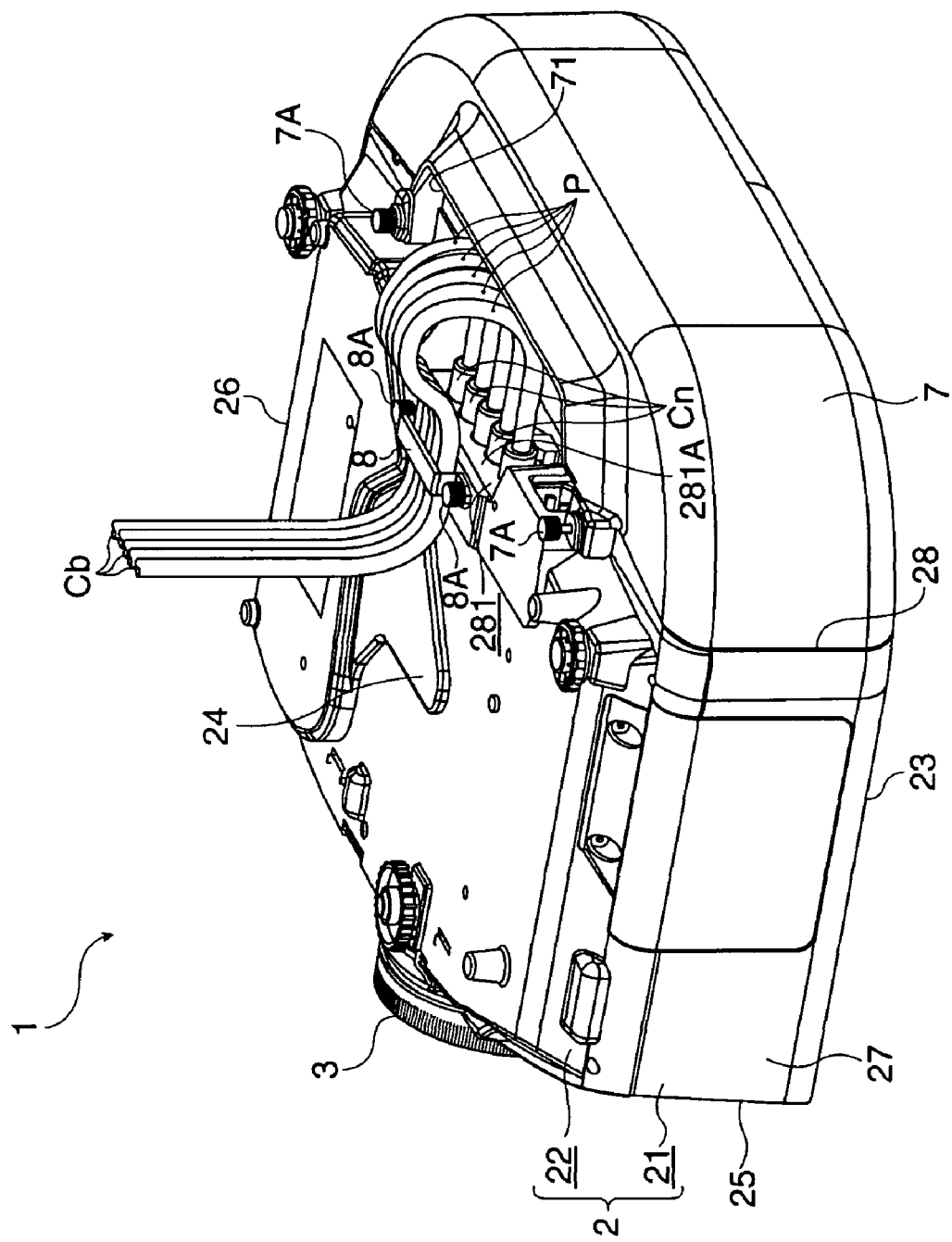
FIG. 6 is a view explaining a use pattern of the first connection terminal group according to Second Embodiment of the invention.

FIG. 6 is a view explaining a use pattern of the first connection terminal group 5 according to Second Embodiment. In the embodiment, the only point different from First Embodiment is that a binding member 8 which binds plural connection cables Cb connected to the first connection terminal group 5 is provided when using the first connection terminal group 5 as shown in FIG. 6.

The binding member 8 has an approximately U-shape, in which respective tip portions of the U-shape are extended outward as shown in FIG. 6. The binding member 8 is fixed near the first concave portion 281 in the bottom surface 24 at the extended portions thereof by using fixing screws 8A in a state in which plural connection cables Cb are arranged inside the U-shape.

The plural connection cables Cb connected to the first connection terminal group 5 are bent toward the front surface side along the bottom surface 24 by the binding member 8 through a gap between the cutout portion 71 and the first concave portion 281 and wired upward along the vertical axis passing through the approximately central position of the bottom surface 24 as shown in FIG. 6.

According to the above Second Embodiment, in addition to the same advantages as the First Embodiment, there are the following advantages.

In the embodiment, since the projector 1 has the binding member 8, respective connection cables Cb connected to the first connection terminal group 5 can be bound once on the bottom surface 24 with the binding member 8. Therefore, the wiring of the respective connection cables Cb can be easily realized. In addition, the respective connection cables Cb are bound once on the bottom surface 24 by the binding member 8, thereby realizing a structure in which respective connection cables Cb are further hardly seen from a user positioned below the projector 1, which makes the appearance of the projector 1 more desirable.

The invention is not limited to the above embodiments, and modifications, improvement and so on in a range in which the advantages of the invention can be attained are included in the invention.

In the embodiments, a forming position (arrangement position) of respective concave portions 281, 282 (respective connection terminal groups 5, 6) is not limited to a back surface portion 28 but other side surfaces 25 to 27 are also preferable. It is also preferable that the respective concave portions 281, 282 are formed at different side surface sides respectively in respective side surfaces 25 to 28.

In the embodiments, the first concave portion 281 has a configuration in which the sidewall portion at the bottom surface 24 side is cut out, thereby connecting the bottom portions 281A of the first concave portion 281 and the bottom surface 24, however, it is not limited to this, and a structure in which the sidewall portion of the bottom surface 24 side is not cut out can be applied.

In the above embodiments, the first connection terminal group 5 is used in the state in which the projector 1 is placed in the suspended attitude and the second connection terminal group 6 is used in the state in which the projector 1 is placed in the positive attitude, however, it is not limited to this, and it is also preferable that the first connection terminal group 5 is used in the state in which the projector 1 is placed in the positive attitude and the second connection terminal group 6 is used in the state in which the projector 1 is placed in the suspended attitude.

In the above embodiment, the transmissive liquid crystal panel is applied as a optical modulator, however, it is not limited to this, it is also preferable that a reflective liquid crystal panel or a DMD (Digital Micromirror Device) (Trademark of Texas Instruments, Inc.) and the like are applied.

In the above embodiments, only the front-projection type projector is cited as an example, however, the invention can be applied to a rear-type projector having a screen which performs projection from the reverse surface side of the screen.

Since the invention is desirable in appearance in the state in which the connection cables are connected to the connection terminal group, it can be applied to projectors used for presentation or a home theater.

The entire disclosure of Japanese Patent Application No. 2008-012455, filed Jan. 23, 2008 is expressly incorporated by reference herein.

What is claimed is:

1. A projector comprising:
   a light source device;
   an optical modulator which modulates luminous flux emitted from the light source device according to image information;
   a projection optical device which enlarges and projects the luminous flux modulated in the optical modulator; and
   an outer casing which houses the light source device, the optical modulator and the projection optical device thereinside, the outer casing having a ceiling surface and a bottom surface with respect to the vertical direction and a side surface connecting to the ceiling surface and the bottom surface,
   wherein:
      a first concave portion which is recessed toward the inside is formed at the bottom surface side in the side surface,
      a first connection terminal group connected to an external device through connection cables is arranged at a bottom portion of the first concave portion in an exposed state,
      a second concave portion recessed toward the inside in a depth dimension smaller than the first concave portion is formed at the ceiling surface side of the first concave portion, and
      a second connection terminal group connected to an external device through connection cables is arranged at a bottom portion of the second concave portion in an exposed state.

2. The projector according to claim 1,
   wherein a sidewall portion at the bottom surface side in the first concave portion is cut out, thereby connecting the bottom portion of the first concave portion and the bottom surface.

3. The projector according to claim 1,
   wherein a binding member attached to the bottom surface and which binds the plural connection cables connected to the first connection terminal group is provided.

* * * * *